United States Patent Office 2,977,669
Patented Apr. 4, 1961

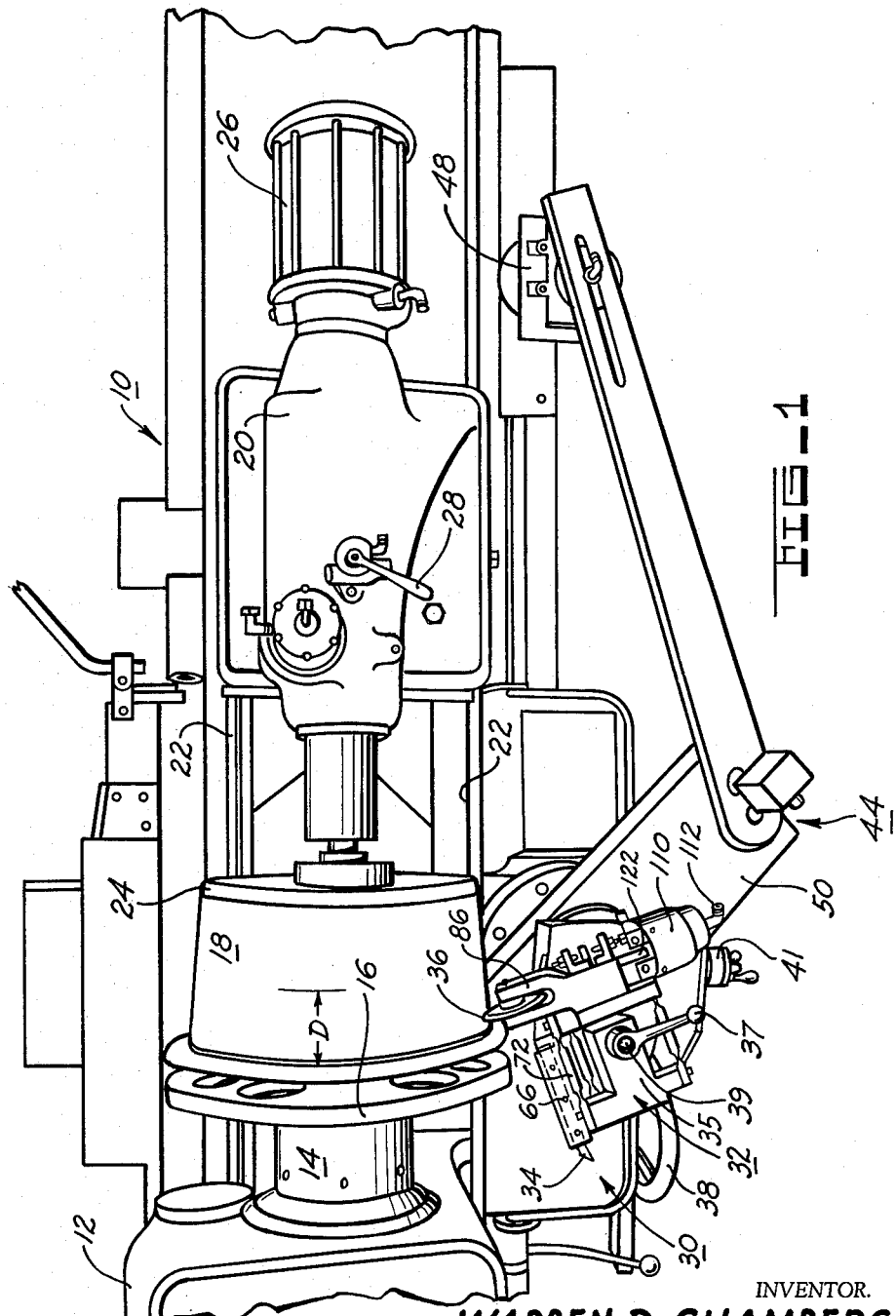

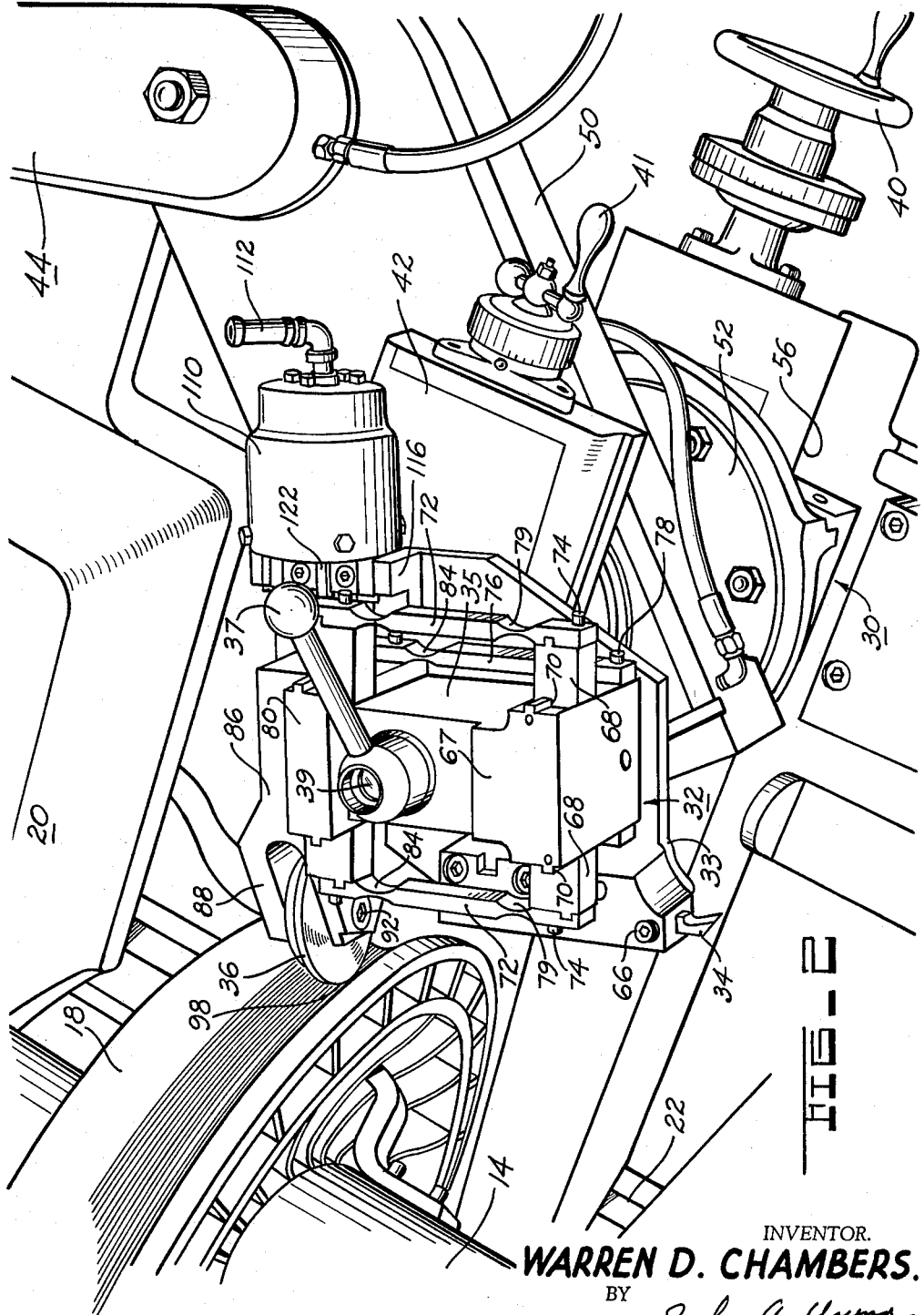

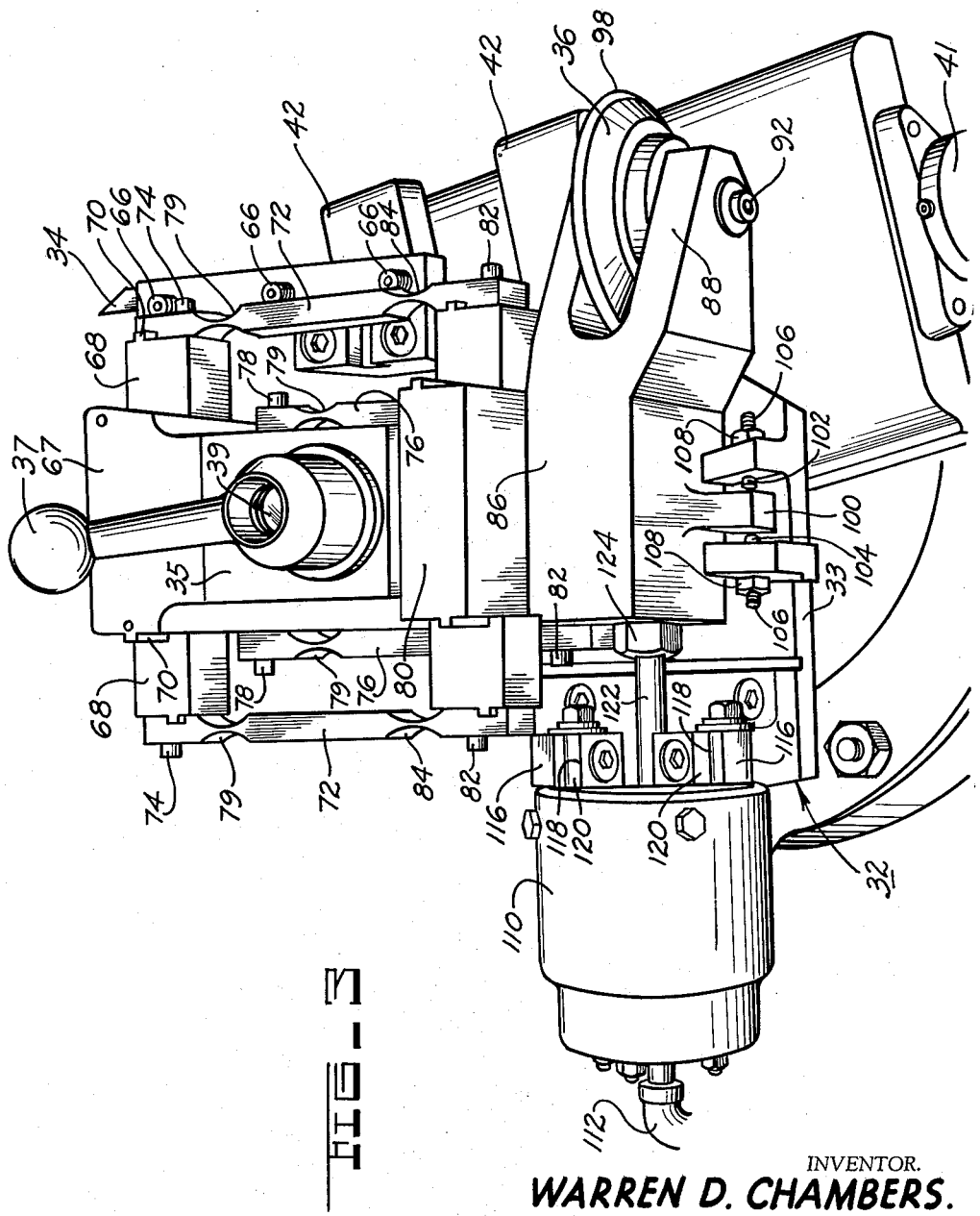

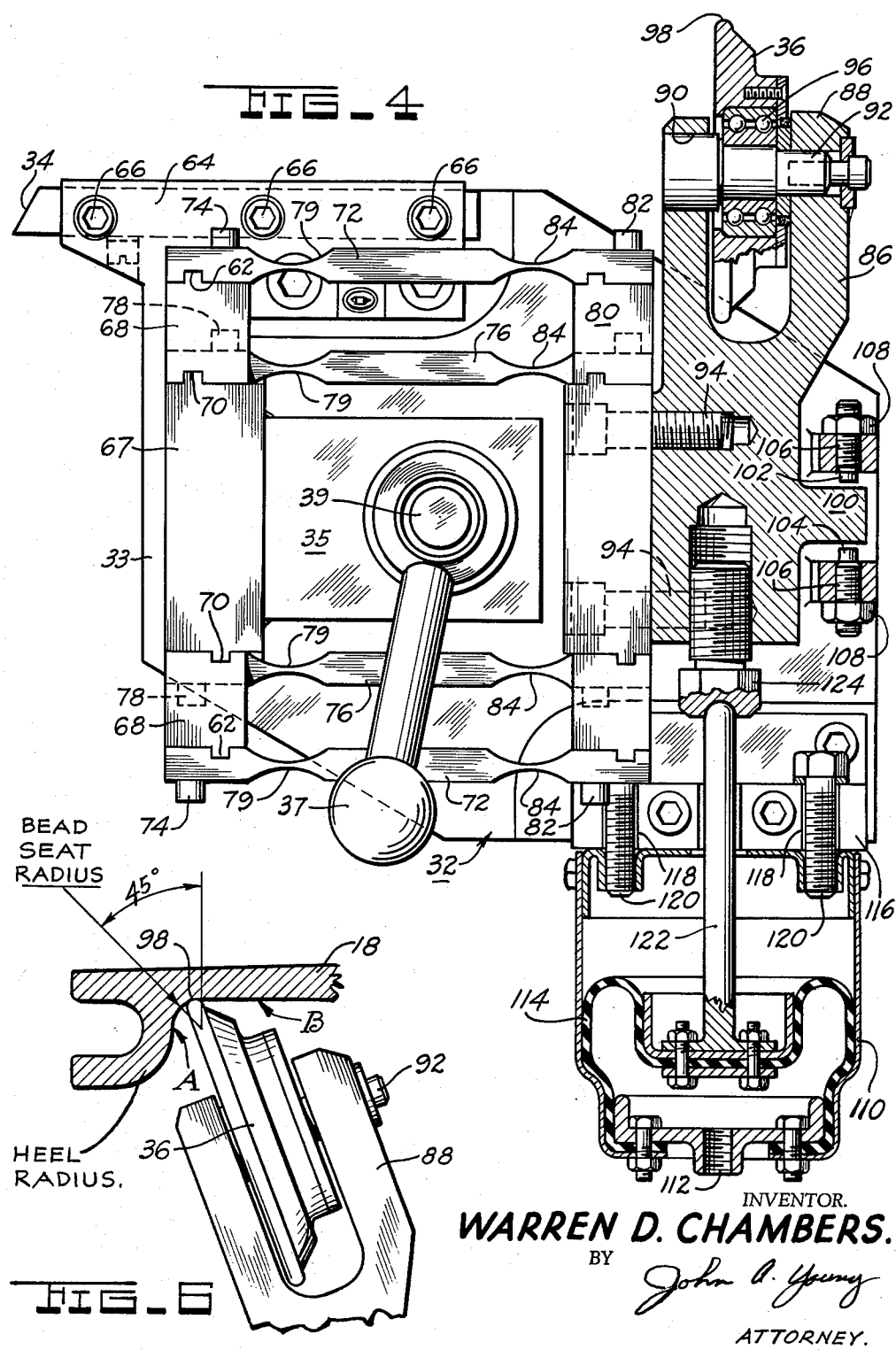

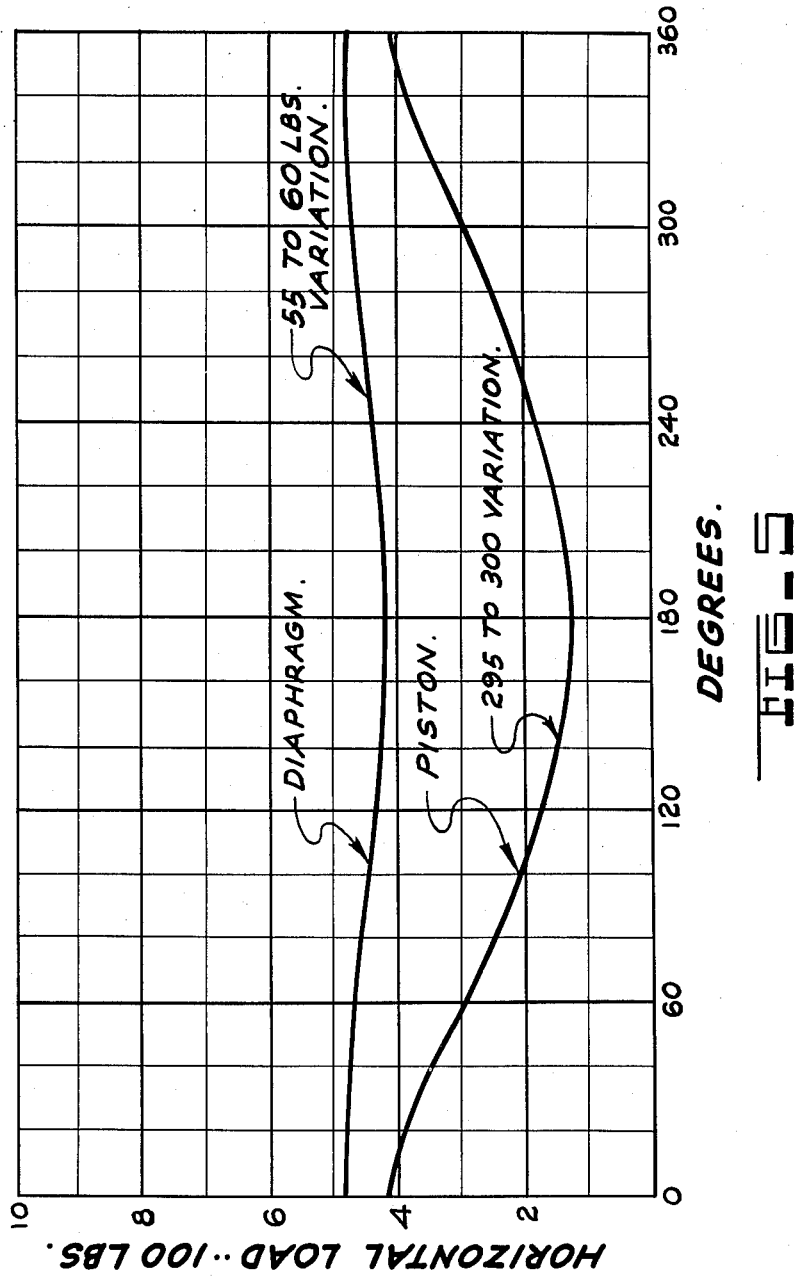

2,977,669

APPARATUS FOR ROLL-BURNISHING AIRCRAFT WHEELS AND THE LIKE

Warren D. Chambers, South Bend, Ind., assignor to The Bendix Corporation, a corporation of Delaware Filed Mar. 6, 1958, Ser. No. 719,538

9 Claims. (Cl. 29—90)

This invention relates to an apparatus for roll-burnishing aircraft wheel structures and the like. In the aircraft wheel and brake art, it has been the practice to use lightweight materials, such as aluminum and magnesium, so that with reduced weight, the aircraft can be made faster and/or its capacity for carrying useful loads can be increased. While a good deal of emphasis in aircraft design is on the obtainment of very lightweight materials, it is of obvious necessity to meet all of the performance expectancies or else the benefits of the lightweight material become largely lost owing to structural failures.

The problem which prompted the present invention, was the low fatigue life of magnesium and aluminum wheel constructions, whether forged or cast. During an aircraft landing, the impact of landing and the weight of the aircraft create very high orders of tensile loading within the wheel. Portions of the wheel are at times subjected to compression loads and at times to tensile loads. The tensile forces in the wheel can eventually develop "fatigue" cracks which propagate and ultimately weaken the wheel structure to the point where it fractures under the described internal stresses. Investigators proposed that a wheel surface treatment known as "burnishing," particularly in the regions where the wheel is subjected to tensile loading, would increase the fatigue life. While in theory, this seemed to be a sound approach, the mechanisms and processes for burnishing the wheel were unsatisfactory since they failed to produce uniformly burnished wheel surface and the result was a lowering of the fatigue life instead of an increase thereof. Since the proposed remedy would at times improve, and would at times detract from the fatigue properties of the wheel, it was a dangerous and ill-advised procedure until means could be devised for insuring both uniformity and reliability of roll-burnishing.

It is an object of the present invention to provide roll-burnishing apparatus and procedure which will consistently increase the fatigue life thereof. It is intended to accomplish this in such manner that the results of the roll-burnishing will be predictable, reliable and will produce a uniformly improved product.

The foregoing object was realized only after efforts were successful in producing a substantially uniform degree of burnishing over the outer surface of the aircraft wheel, and in spite of the variations in radius of the wheel which detract from its circularity in cross section. This is known in the art as "runout." In other words, it became necessary to devise a roll-burnishing means which would bear against the surface of the wheel with a normal force which does not change substantially with runout. To accomplish this, it is necessary that the burnishing wheel be actuatable by a substantially frictionless actuating means which will not unduly resist the inevitable oscillations of the burnishing wheel as it bears against the rotating aircraft wheel. The burnishing wheel oscillations are inevitable because the burnishing wheel follows the running surface of the aircraft wheel. A floatable mounting is provided for the burnishing wheel so that movement of the burnishing wheel is at all times responsive with runout of the aircraft wheel.

It is the principal object of the invention to overcome these described problems and obstacles which have heretofore stood in the way of successful roll-burnishing aircraft wheels.

Other objects and features of the present invention will become apparent from the following detailed description of the invention, which proceeds with reference to the accompanying drawings, wherein:

Figure 1 is a top view of the roll-burnishing apparatus, with all of the essential components thereof included;

Figure 2 is an enlarged isometric detailed view of the cross-feed carriage, on which is mounted the forming tool and roll-burnishing member, the latter being shown in contact with an aircraft wheel;

Figure 3 is an isometric detailed view of the cross-feed carriage, with its associated tools, looking from a different angle from that shown in Figure 2. The aircraft wheel is removed and the cross-feed carriage is detached from the other parts of the machine;

Figure 4 is a top view of the structure shown in Figure 3;

Figure 5 is a graph showing how the normal pressure of engagement of the burnishing wheel against the aircraft wheel can vary with different actuating arrangements; and, Figure 6 is a fragmentary view of an aircraft wheel with the burnishing wheel bearing thereagainst.

Referring now to Figure 1, the roll-burnishing machine, designated generally by reference numeral 10 is provided with a headstock 12 provided with the usual rotatable spindle 14 and a faceplate 16. At the end of the spindle 14 is a series of guides (not shown) which receive an aircraft wheel 18 thereon. The guides receive the wheel hub to radially locate the wheel 18.

Tailstock 20 is slidable along the length of the machine in ways 22. A clamping member 24 is carried at the end of the tailstock 20 and bears against the wheel disk to clamp the wheel against the faceplate 16. The aircraft wheel 18 is thus fixed between the headstock 12 and the tailstock 20 in its proper radial and lateral location and is rotatably driven in this position.

A power cylinder 26 may be provided to bring the clamping member 24 against the aircraft wheel by operation of lever 28, but this is not essential since the usual handwheel arrangements can be used for the same purpose. To accommodate different size aircraft wheels, the tailstock and headstock are moved back and forth to make proper settings.

In the vicinity of the aircraft wheel, there is a cross-feeding carriage 30, having a fixture 32 mounted thereon for movement both longitudinally and transversely of wheel 18. The fixture 32 is shown in Figure 4 and includes a base plate 33. The fixture 32 has a cutting tool 34 and a burnishing wheel 36 carried thereon at 90 degrees relative displacement. The body 35 is locked in position by a handle 37 which is threaded onto a post 39 extending outwardly from the carriage 30 and through an opening in the body 35. A tongue-and-groove connection (not shown) is constructed between the under-surface of the body 35 and the carriage 30. The tongue-and-groove connection can lock the fixture 32 in either the position shown in Figure 1 or 90 degrees clockwise therefrom, these being the operative positions for the burnishing tool and cutting tool, respectively.

The carriage 30 and fixture 32 are set by handwheels 38, 40 and 41. Wheel 38 moves the carriage 30 longitudinally or back and forth along the length of the machine on rails 22. Wheels 40 and 41 adjust the fixture 32 transversely, i.e., across the width of the machine.

Movement of the cutting tool 34 and burnishing wheel 36 is controlled in accordance with a tracer mechanism attachment 44. The tracer mechanism 44 is combined with a template 48 and is connected to the carriage 30 and the fixture 32. As a result, the tracer arm mechanism 44 controls both the longitudinal and lateral or transverse movement of the cutting tool 34 which is caused to profile aircraft wheel 18, in accordance with a predetermined configuration determined by the template 48.

The operation of this tracer arm 44 can be made responsive to either hydromechanical means or electrical means, but this constitutes no part whatever of the present invention. For an explanation of suitable tracer arm attachments mechanisms and their operation, reference may be made to "Tool Engineers' Handbook" (1949), pages 540 and 541. Examples are here given for both pneumatic-hydraulic contouring control and automatic electric tracer control.

Referring next to Figures 2, 3 and 4, a detailed description of the fixture 32 and its associated structure will be considered. On top of carriage 30 is a turntable 52 which is connected with an arm 50 of the tracer arm. The carriage 30 can move longitudinally (back and forth) on ways 22 (Figure 1). The turntable 52 is transversely movable on the cross-slide ways 56. The composite of this motion is imparted to the fixture 32.

Fixture 32 with its key-and-slot connection (not shown) with the body 35 is spring biassed upwardly so that when the handle 37 is unscrewed from the post 39, the fixture is forced upwardly to disengage it from the compound rest 42 (Figure 3), allowing rotation of the fixture 32 to bring either the burnishing wheel 36 or the cutting tool 34 into operative position. The post 39 is rigidly fixed in the compound rest 42 and extends upwardly through an opening in body 35. The upper end of the post 39 is threaded to receive handle 37.

The cutting tool 34 is mounted in a holder and is held by machine screws 66.

Perpendicularly mounted on the base plate 33 is an end wall 67 of solid metal cross section which may be made an integral part of body 35. Two adapter bars 68 are tenoned with end wall 67 by tongue-and-groove connections 70. A flexible mounting strut or mounting bar 72 is then bolted to each of the adapter members 68 by bolts 74, and a second pair of flexible struts or mounting bars 76 is bolted directly to the end wall 67 by bolts 78. The struts 72 and 76 have concave notches 79 formed therein adjacent to the point where they are attached to the end wall 67 which give a certain amount of flexibility to the mounting struts. This enables the struts 72 and 76 to bend easily and because they are resilient they assume their original position when any external forces thereon are relieved. A connecting link 80 is fastened by cap screws 82 to the free ends of the struts 72 and 76. Where the struts connect with link 80 there is another series of concave notches 84 which lends resiliency to the struts 72 and 76 and permits the connecting link 80 to move back and forth under external force.

The burnishing wheel is canted with respect to the aircraft wheel (see Figure 6) so that the burnishing wheel can travel around the bead seat radius of the aircraft wheel while being forced against the aircraft wheel. The normal load of the burnishing wheel against the aircraft wheel imposes at times a tensile load and at times a compressive load on the struts 72 and 76 depending on the location of the burnishing wheel. This load is resisted by the keys 62, 70 instead of the machine screws 74, 78.

Still referring to Figure 4, there is a burnishing wheel carrier 86 which is bifurcated at 88 to receive a stepped diameter, bearing-mounted axle 92, which is journaled in bifurcated end 88 of the wheel carrier 86. The wheel carrier 86 is bolted by the cap screws 94 to the connecting link 80 which in turn is secured as previously described to the flexible struts 72 and 76.

A double-row ball bearing assembly 96 is provided between the axle 92 and the burnishing wheel 36. Since the burnishing wheel carrier 86 (and burnishing wheel) is supported by the flexible struts 72, 76 then the burnishing wheel 36 becomes floatably mounted with respect to the fixture 32.

The part of the burnishing wheel which engages the aircraft wheel has a nose radius 98 which develops sufficient compressive force on the surface of the wheel to impart a compressive prestress therein without producing scoring or grooving of the surface. Much investigation has been made as to what is the optimum nose radius of the burnishing wheel, and it can be stated for example purposes here that a ⅛ inch radius is acceptable for roll-burnishing aircraft wheels. This should not be interpreted as a limitation of the invention since other radius dimensions are equaly acceptable.

The wheel carrier 86 has a boss 100 (Figures 3, 4) which is movable between two adjustable stops 102 and 104 which can be moved back and forth relatively to the boss by means of threaded stems 106. Stems 106 are thereafter prevented from further movement by locking nuts 108. Stop 102 limits movement of the burnishing wheel 36 toward the aircraft wheel by the actuator. The reason for stop 102 is that the actuator can develop considerable bending force on the struts 72, 76 and can bend them beyond their elastic limit if the aircraft wheel is out of contact with the burnishing wheel 36. The purpose of stop 104 is to limit movement of the burnishing wheel 36 away from the aircraft wheel so that if the burnishing wheel 36 should be biassed away from the aircraft wheel by an excessive amount, this will not place undue strain upon the flexible struts 72, 76.

To actuate the burnishing wheel 36 there is a power cylinder 110 which connects with a pneumatic pressure source (not shown) through a conduit 112. In the cylinder 110 is a flexible diaphragm 114 which is movable by the pneumatic pressure in the power cylinder without rubbing engagement with any portion of the cylinder. There is substantially frictionless movement of the diaphragm within the power cylinder, and this is important to the roll-burnishing operation. Power cylinder 110 is mounted on the base plate 33 of fixture 32 through an upturned flange 116 having slots 118 which receive the draw bolts 120 which clamp the power cylinder thereto. A plunger 122 transmits applying force from the diaphragm 114 to the wheel carrier 86 through the intermediary of a socket end adjuster bolt 124, which is threadedly received in wheel carrier 86.

*Operation*

The aircraft wheel 18, which is a forged or cast metal part consisting of aluminum, magnesium or the like, is mounted between the faceplate 16 and the clamping plate 24 of the tailstock 20. The machine is actuated so that the aircraft wheel 18 is caused to rotate by the spindle 14. The fixture 32 is indexed so that the cutting tool 34 faces the aircraft wheel. Manual adjustment of the handwheel 41 and template 48 are previously made to secure the proper setting for the wheel profiling.

Tracer arm 44, acting responsively to the template 48, will cause the carriage 30 to move longitudinally, and the fixture 32 to move transversely so that the combination of the two movements will produce a proper contouring or profiling of the wheel 18. This contouring is not only across the rim of the wheel but also includes the bead seat radius at the side of the wheel adjacent faceplate 16. When the profiling is completed, the handle 37 is turned sufficiently to disengage base plate 33 from its tongue-and-groove connection (not shown) on the compound rest 42, a lifting spring being provided in combination with the body 35 to produce this disengagement once the handle 37 is loosened.

The fixture 32 is indexed to bring the burnishing wheel 36 into the position shown in Figures 1 and 2 with respect to the aircraft wheel and the handle 37 is tightened down to lock the fixture in this position. The aircraft wheel 18 is then caused to rotate, and the tracer arm 44 actuated to cause the fixture, including the roll-burnishing wheel 36, to traverse the same path followed by the cutting tool 34, this path being in accordance with the template 48. In this instance, sufficient air pressure is introduced to the power cylinder to deflect the diaphragm 114 which, acting through the rod 122 and carrier 86, biases the burnishing wheel 36 against the surface of the aircraft wheel 18. Movement of the burnishing wheel 36 across the width of the aircraft wheel 18 is coordinated with the rotation of aircraft wheel 18 so that the nose radius 98 of the wheel is caused to bear against all of the surface of revolution area of the wheel 18 within the distance labeled "D" in Figure 1.

The portion of the wheel rim known as the "bead ledge" in the region "B" (Figure 6) is burnished so that the rim surface has better wear resistance to rubbing contact from the tire. Most wheel failures from fatigue, however, are due to fracturing in the bead seat radius at the 45 degree angle adjacent the bead ledge in the region "A." The burnishing in the latter region guards against fatigue failures, when the burnishing tool finishes its initial 45 degree angle movement around the bead seat radius it begins to retract and the burnishing is ended about 90 degrees from the bead ledge around the bead seat radius.

The critical factor in performing satisfactory roll burnishing, is to obtain a uniform compressive prestress around the circumference of the wheel 18 and across its bead ledge and bead seat radius. Most of the defects in previous methods of roll-burnishing are attributed to non-uniformity of roll-burnishing. Variations in normal force between the burnishing wheel and the aircraft wheel occur because of runout of the aircraft wheel. With a rigid mounting structure for the burnishing wheel, the aircraft wheel runout will cause an increase in the normal force or decrease the normal force depending upon the direction of runout.

It will be appreciated that only very slight runout is necessary to alter by large amounts, the normal force of the burnishing wheel 36 against the aircraft wheel 18. Some runout owing to noncircularity and shifting of the wheel between the headstack faceplate 16 and damping member 24 is inevitable. The normal force of the burnishing wheel 36 against the aircraft wheel 18 is maintained substantially constant notwithstanding runout by virtue of the floatable resilient mounting of the burnishing wheel 36, this flotation being obtainable by virtue of the struts 72 and 74.

Another factor contributing to uniformity of roll-burnishing is the usage of a frictionless actuating means so that burnishing pressure is not modified by friction within the actuator arising from movement of its component parts.

If there is used in place of the diaphragm 114, a conventional piston-cylinder arrangement, the inevitable friction force between the piston and cylinder wall tends to resist movement of the burnishing wheel 36 away from the aircraft wheel 18 and the added friction force inadvertently contributes to the normal force of engagement between the burnishing wheel 36 and the opposing aircraft wheel and there results a variation thereof around the wheel circumference. On the other hand, the diaphragm 114 can be moved frictionlessly to allow for in and out movement of the burnishing wheel 36 so as not to introduce a factor of resistance to the floatable burnishing wheel mounting which is essential to its maintaining constant normal pressure.

Referring to Figure 5, there is shown the normal load of the burnishing wheel against the aircraft wheel for different angular locations about the circumference of the aircraft wheel. The variation in normal pressure developed by the piston actuator is from about 410 pounds force at zero degrees to about 130 pounds force at 180 degrees. This force is gradually restored as the wheel rotates from 180 to 360 degrees. The pressure differential produces appreciable difference in compressive prestress around the circumference of the wheel. If the normal force between burnishing wheel 36 and aircraft wheel 18 becomes excessive due to frictional resistance adding to the normal piston load from air pressure, then galling results and the fatigue life of the wheel 18 instead of being improved is actually reduced.

Compared with the performance of the piston-cylinder actuator, the diaphragm actuator with the same aircraft wheel has a variation in normal force of about 480 to 420 pounds around the circumference of the wheel. This is well within acceptable variation which produces uniform compressive prestress around the wheel and across the width of the bead ledge and bead seat radius. This uniformity produces a reliable, reproducible, and predictable compressive prestress which greatly improves the life of the wheel.

Since the roll-burnishing wheel traverses the same path followed by the forming tool, the flexible struts are maintained in their neutral or unbent position and the burnishing wheel 36 can move in and out between stops 102 and 104.

It is not essential to the invention that the fixture 32 be provided with both the roll-burnishing attachment 36 and the cutting tool 34. This is a convenience and while it is a decided advantage, it is not a limitation of the invention.

It is also anticipated that beside a roll-burnishing fixture, a ball-burnishing tool also be used, these being commonly known mechanical equivalents.

To obtain satisfactory compressive prestress on the aircraft wheel, it is necessary to rotate the aircraft wheel at sufficiently low speed so that the floatable mounting will enable the roll-burnishing tool to respond to wheel runout. Thus, if the aircraft wheel were rotating at a very high rate of speed, the inertia of the roll-burnishing wheel and its associated structure would not permit it to follow the runout in a short enough time to effectively maintain the normal pressure. For this reason the aircraft wheel, during roll-burnishing, is not rotated at excessive speeds. It has been found by test, that the wheel should not rotate at a speed faster than that which will produce a surface speed of 750 feet per minute. This surface speed is, however, somewhat variable with the diameter of the work piece and the results desired, and is not to be construed as a limitation on the scope of the present invention.

As previously mentioned, the invention is in no way limited to composition or previous processing history of the aircraft wheel. Thus, the wheel may consist of steel, aluminum, magnesium, titanium or other materials which may be forged, cast, stamped, etc.

While the invention has been described, with but a single selective embodiment, it will be understood that this is only a preferred embodiment of the invention and in no way is limitative thereof. It is intended, therefore, that such variations and revisions of the invention as are reasonably to be expected on the part of those skilled in the art, will be included within the scope of the following claims so long as these variations and revisions incorporate the herein disclosed principles.

I claim:

1. A roll-burnishing machine for aircraft wheels comprising, in combination: means for supporting and turning an aircraft wheel, a cross-feeding carriage having a roll-burnishing wheel mounted thereon, a contouring means combined with said cross-feeding carriage to direct the longitudinal and cross-feed movement thereof so that said roll-burnishing wheel follows the profile of the aircraft wheel according to the shape by a template in said contouring means, a fixture received on said carriage and locating the burnishing wheel, said fixture being indexable on said carriage to bring the burnishing wheel in operative relation with respect to the aircraft wheel, means for clamping said fixture onto said carriage, and means for applying said burnishing wheel against the surface of the wheel with a substantially constant normal force, said last mentioned means including a plurality of flexible supporting members which are held at one end on said fixture and extend into operative connecting relation with said burnishing wheel to allow slight relative movement of the burnishing wheel with respect to said fixture so that normal force of the burnishing wheel against the aircraft wheel is not varied by runout of the aircraft wheel during rotation thereof, and means for urging said burnishing wheel against the aircraft wheel and consisting essentially of a fixed air chamber, a diaphragm which moves frictionlessly responsively to pressure developed in said chamber, and a plunger leading from said diaphragm and operatively connected with said burnishing wheel, said burnishing wheel being thereby urged into engagement with the wheel and floatably maintained thereagainst by a force which is substantially not variable owing to the flexible support rendered by said supporting members, and stop means limiting movement of the burnishing wheel toward the aircraft wheel by said diaphragm.

2. An apparatus for roll-burnishing aircraft wheel structures comprising, means for rotatably mounting an aircraft wheel, a cross-feeding carriage movable both transversely and longitudinally with respect to said aircraft wheel, a fixture which is clamped to said carriage, a burnishing wheel supported on said fixture, guiding means for controlling the transverse and longitudinal movement of said carriage and fixture so that the burnishing wheel will move in accordance with the profile of said aircraft wheel, a plurality of flexible supporting elements which carry said burnishing wheel to permit floatable movement thereof relatively to said fixture, and substantially frictionless actuating means for applying said burnishing wheel against the periphery of said aircraft wheel, said actuating means consisting essentially of a pressure chamber, a diaphragm responsive to pressure in said pressure chamber, and a plunger connected to said diaphragm and operatively connected to said burnishing wheel which is confined by said flexible supporting elements to movement parallel to the axis of said actuating means, said flexible supporting elements serving to yieldably maintain wheel burnishing engagement pressure against said aircraft wheel regardless of runout of the aircraft wheel so that the burnishing pressure is substantially uniform around the circumference and across the width of said wheel as the burnishing wheel traverses a profiling path in accordance with said guiding means.

3. In an apparatus for roll-burnishing an aircraft wheel, a cross-feed carriage which moves both longitudinally and transversely with respect to the aircraft wheel, a tracer means operatively controlling the longitudinal and transverse movement of said carriage according to a template combined with said tracer means, said template corresponding to the profile of said aircraft wheel, a burnishing wheel flexibly mounted on said carriage, an actuator for forcing said burnishing wheel into engagement with the aircraft wheel, said actuator having a pressure chamber fixedly mounted on said carriage, a diaphragm frictionlessly movable responsively to pressure developed in said pressure chamber, and a plunger operatively connecting said diaphragm and burnishing wheel to force said burnishing wheel into engagement with the aircraft wheel, said flexible support serving to yieldingly hold the burnishing wheel so that movement thereof is constrained to floatable aircraft-wheel-engaging motion whereby pressure developed by said burnishing wheel from said diaphragm remains substantially constant around the periphery of said aircraft wheel.

4. In a roll-burnishing apparatus, a carriage having a roll-burnishing wheel, said carriage being movable both transversely and longitudinally in accordance with a predetermined construction, said carriage being indexed to bring the roll-burnishing wheel into operative position, means flexibly supporting said roll-burnishing wheel on said carriage to permit floatable movement thereon, and a substantially frictionless actuator comprising a pressure chamber secured to said carriage, a diaphragm movable responsively to the pressure in said chamber, and force transmitting means between said diaphragm and roll-burnishing wheel to force said burnishing wheel against the work to be finished, said flexible supporting means allowing floatable movement of said burnishing wheel to maintain substantially constant the engagement pressure of said burnishing wheel against the work, regardless of runout in the work.

5. In a roll-burnishing apparatus a cross-feed carriage movable both transversely and longitudinally in accordance with an established path, a flexible cantilever support member fixedly secured at one end to said carriage, a roll-burnishing tool operatively connected to the free end of said cantilever support member and flexibly supported by said cantilever support member to permit floatable frictionless movement thereof relatively to said carriage.

6. The roll-burnishing structure of claim 5 including actuating means combined with said roll-burnishing tool, said actuating means comprising a fixed pressure chamber, a diaphragm movable responsively to the pressure in said chamber, and force transmitting means acting between said diaphragm and burnishing tool to develop a normal force thereon which remains substantially constant owing to the floatable frictionless movement of said roll-burnishing tool.

7. The structure of claim 6 including stop means for limiting lateral movement of said burnishing tool by said actuating means.

8. In a roll-burnishing machine, the combination of a carriage having an indexable fixture mounted thereon, means for clamping said fixture in a selected position, a flexibly mounted burnishing wheel operatively carried by said fixture, and a substantially frictionlessly operative expander member combined with said burnishing wheel and acting through a push rod to develop applying force on said burnishing wheel, said applying force being substantially unaffected by slight reciprocal movement thereof owing to runout of the part being roll-burnished.

9. In a roll-burnishing apparatus, a cross-feed carriage movable both transversely and longitudinally relative to a workpiece in accordance with an established path, a plurality of flexible cantilever members fixedly secured at one end to said carriage, a roll-burnishing tool operatively connected to the opposite ends of said plurality of cantilever members and flexibly supported adjacent said workpiece by said plurality of cantilever members, and a substantially frictionless fluid pressure operated actuator means operatively connected to said roll-burnishing tool and operative to press said tool into engagement with said workpiece and establish a predetermined burnishing pressure between said tool and workpiece, said roll-burnishing tool being held in yieldable engagement with said workpiece by said flexible cantilever member which yields in response to run out of the workpiece to thereby maintain said burnishing pressure substantially unaffected by run out of said workpiece.

(References on following page)

References Cited in the file of this patent

UNITED STATES PATENTS

| | | |
|---|---|---|
| 2,453,797 | Johnson | Nov. 16, 1948 |
| 2,525,216 | Garrand | Oct. 16, 1950 |
| 2,559,360 | Kurzweil | July 3, 1951 |
| 2,601,716 | Laningham | July 1, 1952 |
| 2,701,484 | Bedker | Feb. 8, 1955 |
| 2,703,920 | Parker | Mar. 15, 1955 |
| 2,748,642 | Pirkner | June 5, 1956 |
| 2,761,427 | Shumaker | Sept. 4, 1956 |
| 2,791,024 | Vavrinek | May 7, 1957 |
| 2,839,086 | Engelberger | June 17, 1958 |
| 2,849,904 | Hill | Sept. 2, 1958 |
| 2,876,528 | Wulpi | Mar. 10, 1959 |